US012013016B2

(12) United States Patent
Xu et al.

(10) Patent No.: US 12,013,016 B2
(45) Date of Patent: Jun. 18, 2024

(54) LINEAR ACTUATOR

(71) Applicant: ZHEJIANG JIECANG LINEAR MOTION TECHNOLOGY CO., LTD., Zhejiang (CN)

(72) Inventors: Xin Xu, Zhejiang (CN); Xinxing Zhao, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 126 days.

(21) Appl. No.: 17/783,649

(22) PCT Filed: Apr. 19, 2021

(86) PCT No.: PCT/CN2021/088231
§ 371 (c)(1),
(2) Date: Jun. 9, 2022

(87) PCT Pub. No.: WO2021/218689
PCT Pub. Date: Nov. 4, 2021

(65) Prior Publication Data
US 2023/0012355 A1 Jan. 12, 2023

(30) Foreign Application Priority Data
Apr. 29, 2020 (CN) .......................... 202010355867.4

(51) Int. Cl.
*F16H 25/24* (2006.01)
*F16D 11/14* (2006.01)
*F16H 25/20* (2006.01)

(52) U.S. Cl.
CPC ......... *F16H 25/2454* (2013.01); *F16D 11/14* (2013.01); *F16H 2025/2071* (2013.01);
(Continued)

(58) Field of Classification Search
CPC ......... F16H 2025/2463; F16H 25/2454; F16H 25/2015; F16H 2025/2071; F16H 25/2021
See application file for complete search history.

(56) References Cited

U.S. PATENT DOCUMENTS 9,074,659 B2* 7/2015 Wu ........................ F16H 1/125
2014/0345404 A1 11/2014 Wu

FOREIGN PATENT DOCUMENTS

CN 106246752 12/2016
CN 206054568 3/2017
(Continued)

OTHER PUBLICATIONS

"International Search Report (Form PCT/ISA/210) of PCT/CN2021/088231," mailed on Jul. 9, 2021, with English translation thereof, pp. 1-6.
(Continued)

*Primary Examiner* — Gregory Robert Weber
(74) *Attorney, Agent, or Firm* — JCIPRNET

(57) ABSTRACT

Disclosed is a linear actuator including a housing, a worm wheel, a rotating screw and a drive nut. The worm wheel drives the rotating screw to rotate. The rotating screw rotates to drive the drive nut to move axially along the rotating screw. A clutch means is arranged between the worm wheel and the rotating screw. The clutch means includes a coupling gear sleeve axially movable relative to the rotating screw. The rotating screw is sleeved with an axial limiting sleeve. The axial limiting sleeve and the housing are abutted axially. The axial limiting sleeve and the rotating screw maintain alignment in an axial direction. When the rotating screw is subjected to an axial load, the rotating screw transmits axial force to the housing through the axial limiting sleeve, and the axial force is not transmitted between the coupling gear sleeve and the axial limiting sleeve in the axial direction.

9 Claims, 6 Drawing Sheets

(52) U.S. Cl.
CPC ............ *F16H 2025/2084* (2013.01); *F16H 2025/209* (2013.01); *F16H 2025/2463* (2013.01)

(56) References Cited

FOREIGN PATENT DOCUMENTS

| | | |
|---|---|---|
| CN | 207796016 | 8/2018 |
| CN | 111043184 | 4/2020 |
| CN | 111577850 | 8/2020 |
| CN | 111600432 | 8/2020 |
| CN | 112096819 | 12/2020 |
| WO | 2019091997 | 5/2019 |

OTHER PUBLICATIONS

"Search Report of Europe Counterpart Application", issued on Apr. 26, 2023, p. 1-p. 8.

* cited by examiner

LINEAR ACTUATOR

CROSS-REFERENCE TO RELATED APPLICATION

This application is a 371 of international application of PCT application serial no. PCT/CN2021/088231, filed on Apr. 19, 2021, which claims the priority benefit of China application no. 202010355867.4, filed on Apr. 29, 2020. The entirety of each of the above-mentioned patent applications is hereby incorporated by reference herein and made a part of this specification.

TECHNICAL FIELD

The present invention relates to a linear actuator with smooth clutch, belonging to the technical field of linear transmission.

BACKGROUND

Linear actuator, also known as electric push rod, is widely used in furniture, medical equipment, solar power generation and other fields. Its main structure includes a drive motor, a worm wheel, a worm gear, a screw and a nut. Its working principle is that the drive motor drives the worm wheel to rotate, the worm wheel meshes with the worm gear to drive the worm gear to rotate, the worm gear rotates to drive the screw to rotate, and the screw rotates to drive the nut to move axially. The nut is generally connected with an inner tube, thereby achieving the telescopic movement of the inner tube.

Combined with the application environment of the linear actuator, when the linear actuator encounters the fault of the drive motor, or when the power is cut off or when the power needs to be cut off, a clutch means will be added to the linear actuator. The clutch means is mainly used to cut off the power between the drive motor and the rotating screw, so that the reverse push can be achieved by manually driving the rotating screw to rotate.

For clutch means, most of them accomplish motive docking by pivoting one of the two components to move axially. If the two components are acted by axial force, it will inevitably affect the difficulty of pivoting, resulting in unsmooth clutch means, poor operation experience and even possible damage to the clutch means

SUMMARY

The technical problem to be solved by the present invention is that the present invention overcomes the deficiency of the prior art and provides a linear actuator with smooth clutching, so that the clutch means has better smoothness when being driven.

To solve the above technical problem, the present invention adopts the following technical solution:

a linear actuator includes a housing, a worm wheel, a rotating screw and a drive nut, the worm wheel driving the rotating screw to rotate, the rotating screw rotating to drive the drive nut to move axially along the rotating screw, a clutch means being arranged between the worm wheel and the rotating screw, wherein the clutch means includes a coupling gear sleeve axially movable relative to the rotating screw, the rotating screw is sleeved with an axial limiting sleeve, the axial limiting sleeve and the housing are abutted axially, and the axial limiting sleeve and the rotating screw maintain alignment in an axial direction, when the rotating screw is subjected to an axial load, the rotating screw transmits axial force to the housing through the axial limiting sleeve, and the axial force is not transmitted between the coupling gear sleeve and the axial limiting sleeve in the axial direction.

The present invention has the advantages that:

the linear actuator in the present invention is provided with a clutch means, which is mainly implemented by driving the axial movement of the coupling gear sleeve, so that it is optimal for the coupling gear sleeve to be subjected to forces from the driving member only, avoiding or reducing axial forces from other components as much as possible. In the whole linear actuator, the axial force of other components mainly comes from the rotating screw, the rotating screw pushes the target to be pushed through the drive nut, and the target to be pushed may naturally react the bearing capacity to the rotating screw. If the rotating screw transmits the axial force to the coupling gear sleeve of the clutch means, the resistance may increase when the user needs to toggle the coupling gear sleeve, and the clutch means will be easily damaged after long-term use.

For this reason, in this embodiment, the axial limiting sleeve is sleeved outside the rotating screw, and the axial limiting sleeve itself is axially limited to the rotating screw. Secondly, the axial limiting sleeve is also axially limited with the housing. With this installation method, the axial force on the rotating screw can be transmitted to the housing through the axial limiting sleeve, while the axial force is not transmitted between the coupling gear sleeve and the axial limiting sleeve, therefore, the coupling gear sleeve will not be subjected to the axial force from the rotating screw, and the user will save labor when using the driving member to toggle the coupling gear sleeve, and at the same time, the strength requirement of the coupling gear sleeve itself is also reduced, which is also beneficial to prolonging the service life of the clutch means.

Preferably, the linear actuator further includes a first friction sleeve and a self-locking torsion spring sleeved outside the first friction sleeve, and the axial limiting sleeve includes the first friction sleeve.

Preferably, the linear actuator further includes a second friction sleeve, the first friction sleeve and the second friction sleeve are abutted axially, the second friction sleeve is sleeved with a release torsion spring, and the axial limiting sleeve includes the first friction sleeve and the second friction sleeve.

Preferably, the first friction sleeve and the second friction sleeve are axially arranged side by side, and outer end faces of the first friction sleeve and the second friction sleeve abut against each other.

Preferably, the second friction sleeve is sleeved outside the first friction sleeve, and an outer end face of the first friction sleeve abuts against an inner end face of the second friction sleeve.

Preferably, the second friction sleeve is provided with a bearing, the housing is provided with a bearing groove for mounting the bearing, and the bearing is axially limited with the housing.

Preferably, the first friction sleeve is sleeved at an end portion of the rotating screw, and the housing includes a tail puller at the end portion, and the tail puller is axially limited with the second friction sleeve.

Preferably, a spline sleeve is arranged between the rotating screw and the coupling gear sleeve, and the spline sleeve is axially limited with the first friction sleeve, and the axial limiting sleeve includes the spline sleeve, the first friction sleeve and the second friction sleeve.

Preferably, a tapered roller bearing is arranged between the second friction sleeve and the tail puller.

Preferably, the linear actuator further includes a hand-pulling release assembly, the hand-pulling release assembly further includes a pull rod and a swing link, the pull rod being axially movable relative to the rotating screw, the swing link being rotationally connected with the pull rod, and when the pull rod is pulled, the swing link swings to axially push the coupling gear sleeve.

These features and advantages of the present invention will be disclosed in detail in the following detailed description of the embodiment and the drawings.

BRIEF DESCRIPTION OF THE DRAWINGS

The present invention is further explained below with reference to the accompanying drawings.

DESCRIPTION OF THE EMBODIMENTS

Figure 1:
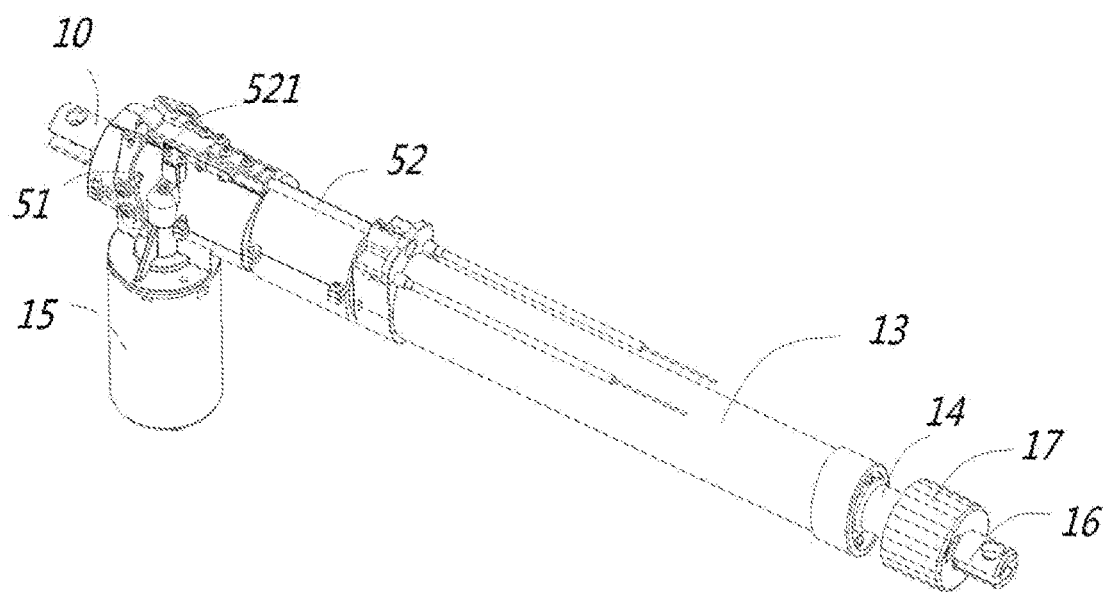
FIG. 1 is an overall schematic diagram I of a linear actuator according to embodiment I of the present invention.

The technical solutions of the embodiments of the present invention are explained and illustrated below in conjunction with the accompanying drawings of the embodiments of the present invention, but the following embodiments are only preferred embodiments, not all of them. Based on the embodiments in the implementations, all other embodiments obtained by those skilled in the art without making creative efforts are within the scope of protection of the present invention.

In the following description, the appearance of terms such as "inner", "outer", "upper", "lower", and "left" and "right" indicating orientation or positional relationship is based on the orientation or positional relationship shown in the drawings only for convenience of description of embodiments and simplification of description, it is not intended to indicate or imply that the devices or elements referred to must have a particular orientation, be constructed or operate in a particular orientation, and therefore, should not be construed as limitations to the present invention.

Embodiment I

As shown in FIGS. 1 to 7, the embodiment is a linear actuator. Linear actuators are also commonly called linear actuators or electric push rods. The linear actuator includes a housing, an outer tube 13, an inner tube 14, a drive motor 15, a gearing assembly, a rotating screw 20 and a drive nut 21. The drive motor 15 drives the rotating screw 20 to rotate through the gearing assembly. The rotating screw 20 rotates to drive the drive nut 21 to move axially along the rotating screw 20, and the drive nut 21 is fixedly connected with the inner tube 14. When the drive nut 21 moves axially, it drives the inner tube 14 to move axially relative to the outer tube 13 and the housing, and an outer end of the inner tube 14 is connected to the target to be driven. The linear actuator in this embodiment further includes:

A clutch means is arranged between the gearing assembly and the rotating screw 20 for connecting or cutting off the power connection between the gearing assembly and the rotating screw 20.

Figure 4:
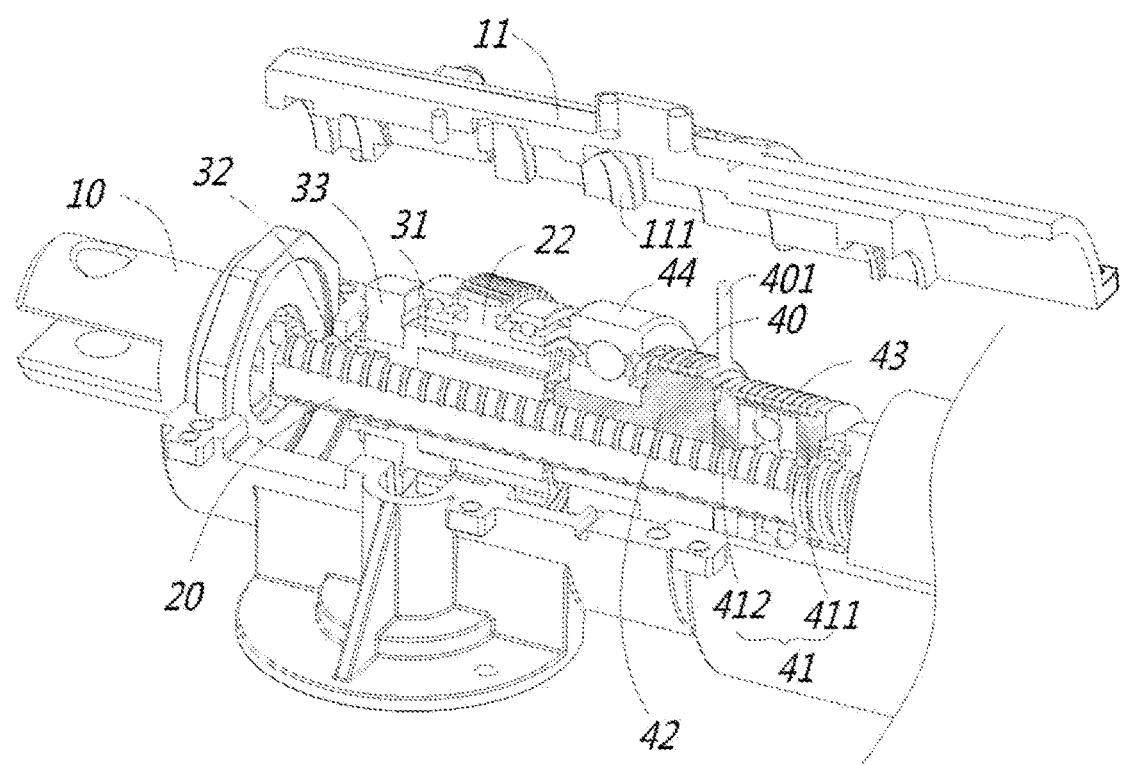
FIG. 4 is a partially enlarged schematic diagram of the linear actuator according to embodiment I of the present invention.
Figure 5:
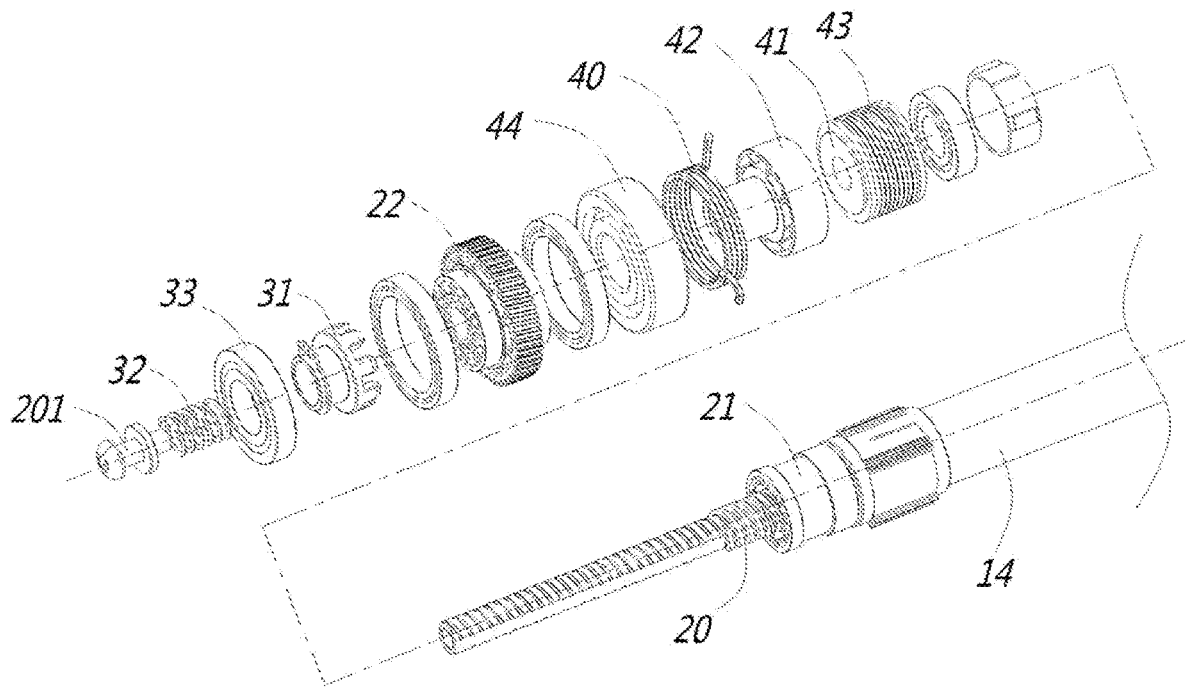
FIG. 5 is an explosion schematic diagram of internal parts of the linear actuator according to embodiment I of the present invention.

The specific structure of the clutch means in the embodiment is as follows: the clutch means includes a coupling gear sleeve 31, the coupling gear sleeve 31 itself is fitted with the rotating screw 20 through a flat position. That is, in a circumferential direction, the coupling gear sleeve 31 and the rotating screw 20 rotate synchronously, but the coupling gear sleeve 31 is axially movable along the rotating screw 20 in the axial direction. The coupling tooth sleeve 31 has a plurality of tooth-shaped parts in a direction of the worm wheel 22, an end face of the worm wheel 22 is provided with a tooth space matched with the coupling gear sleeve 31 for transmission. When the coupling tooth sleeve 31 is close to the worm wheel 22, the tooth-shaped parts are inserted into the tooth space, and the coupling tooth sleeve 31 and the worm wheel 22 rotate synchronously. When the coupling tooth sleeve 31 is far away from the worm wheel 22, the tooth-shaped parts are separated from the tooth space, and the coupling tooth sleeve 31 is separated from the worm wheel 22, that is, the rotating screw 20 will be in a state of no power connection. Referring to FIG. 4, the coupling gear sleeve 31 is inserted into the worm wheel 22.

In this embodiment, the rotating screw 20 is sleeved with an axial limiting sleeve, the axial limiting sleeve and the housing are abutted axially, and the axial limiting sleeve and the rotating screw 20 maintain alignment in an axial direction, when the rotating screw 20 is subjected to an axial load, the rotating screw 20 transmits axial force to the housing through the axial limiting sleeve, and the axial force is not transmitted between the coupling gear sleeve 31 and the axial limiting sleeve in the axial direction.

The axial limiting sleeve is sleeved outside the rotating screw 20, and the axial limiting sleeve itself is axially limited to the rotating screw. Secondly, the axial limiting sleeve is also axially limited with the housing. With this installation method, the axial force on the rotating screw can be transmitted to the housing through the axial limiting sleeve, while the axial force is not transmitted between the coupling gear sleeve 31 and the axial limiting sleeve, therefore, the coupling gear sleeve 31 will not be subjected to the axial force from the rotating screw, and the user will save labor when using the driving member to toggle the coupling gear sleeve 31, and at the same time, the strength requirement of the coupling gear sleeve 31 itself is also reduced, which is also beneficial to prolonging the service life of the clutch means.

In this embodiment, the linear actuator further includes a self-locking device, which generates frictional resistance to the rotating screw 20 when the rotating screw 20 rotates reversely. The structure of the self-locking device in this embodiment is as follows: the self-locking device includes a first friction sleeve 41, a second friction sleeve 42, a release torsion spring 40, a self-locking torsion spring 43, the first friction sleeve 41 and the second friction sleeve 42 are respectively sleeved on the rotating screw 20, the first friction sleeve 41 and the rotating screw 20 are positioned in a flat position, that is, in the circumferential direction, the first friction sleeve 41 and the rotating screw 20 rotate synchronously, while the second friction sleeve 42 rotates freely relative to the rotating screw 20, and in the axial direction, axial end faces of the first friction sleeve 41 and the second friction sleeve 42 abut against each other. Meanwhile, the release torsion spring 40 is sleeved on the second friction sleeve 42, and the release torsion spring 40 clasps the second friction sleeve 42 at all times in the initial state. The first friction sleeve 41 is sleeved with the self-locking torsion spring 43.

Referring to FIG. 4, when the inner tube 14 of the linear actuator extends to a predetermined position and has a tendency to retract, the rotating screw 20 is subjected to axial force, after that, the axial force is transmitted to the first friction sleeve 41, and the first friction sleeve 41 in turn transmits the axial force to the second friction sleeve 42. The second friction sleeve 42 is sleeved with a second bearing 44, and the second bearing 44 is axially limited with a limiting step 111 on the housing, so the axial force is directly transmitted to the housing through the second bearing 44 on the second friction sleeve 42.

Therefore, based on the self-locking device in this embodiment, the first friction sleeve 41, the second friction sleeve 42 and the second bearing 44 in the self-locking device are naturally formed into an axial limiting sleeve, and the rotating screw 20 directly transmits the axial force to the housing through the axial limiting sleeve. Since the entire clutch means is positioned at a rear end of the limiting step 111 of the housing, the clutch means itself is not affected by the axial force during the whole transmission process of the axial force. In such an environment, the user can save more effort when toggling the coupling gear sleeve 31 in the clutch means. Also, since the clutch means is not subjected to the axial force from the rotating screw 20, the service life of the clutch means can be greatly prolonged. Alternatively, it should be noted that if there is no self-locking device in the linear actuator, an additional structure similar to a shaft sleeve can be added to the rotating screw 20 as the axial limiting sleeve.

The first friction sleeve 41 preferably includes a front shaft sleeve 411 and a rear shaft sleeve 412 in this embodiment, and the front shaft sleeve 411 and the rear shaft sleeve 412 are abutted by a thrust bearing in the axial middle. In other embodiments, the first friction sleeve 41 may be in the form of an integral shaft sleeve.

In terms of the hand-pulling release assembly, the hand-pulling release assembly includes a first driving member and a second driving member, the first driving member is connected with the clutch means, the second driving member is used for connecting the self-locking device, the hand-pulling release assembly includes an initial state and a fully released state, during the process from the initial state to the fully released state, the first driving member drives the clutch means to disconnect the power connection, and the second driving member drives the release torsion spring 40 to release.

The linear actuator in this embodiment is provided with both the clutch means and the self-locking device, making the linear actuator more comprehensive in function, and the clutch means combined with the self-locking device also has an advantage that since the power is disconnected by the clutch means, the rotating screw 20 is almost in a completely free rotating state, which easily leads to too fast retraction speed of the linear actuator. However, the self-locking device can just provide a certain resistance to prevent the rotating screw 20 from rotating too fast, thus avoiding too fast retraction speed of the drive nut 21.

Secondly, the self-locking device in this embodiment is also provided with a release torsion spring 40, that is, the self-locking device itself can be unlocked. When the release torsion spring 40 is released, the self-locking device is in an unlocked state. At this time, the self-locking device has little resistance to the rotating screw 20 regardless of the forward rotation or reverse rotation of the linear actuator. This situation can make the linear actuator in a fast release state, that is, it can be quickly retracted.

Finally, the linear actuator in this embodiment is provided with a hand-pulling release assembly. The hand-pulling release assembly includes a first driving member and a second driving member, the first driving member and the second driving member are respectively used for driving the clutch means and the self-locking device, when the linear actuator needs to be released quickly, an operator operates the hand-pulling release assembly to make it in a completely released state, which can make the clutch means in a disconnected state and the self-locking device in an unlocked state at the same time. A user can control two devices only by operating one hand-pulling release assembly, and such an operation is very convenient.

In this embodiment, the first driving member is mainly used for pivoting the coupling gear sleeve 31 to move axially. At the same time, in order to make the clutch means reset after the first driving member is pivoted, the clutch means in this embodiment also includes a return spring 32 which generates axial reset force to the coupling gear sleeve 31. The end portion of the rotating screw 20 is provided with a limiting end 201. The return spring 32 is sleeved on the rotating screw 20, and both ends of the return spring are limited between the finite end 201 and the coupling gear sleeve 31.

The housing in this embodiment includes an upper casing 11 and a lower casing 12, and a first bearing 33 is arranged between the coupling gear sleeve 31 and the casing to reduce the friction resistance when the coupling gear sleeve 31 rotates.

The structure of the first driving member of this embodiment is as follows: the first driving member includes a swing link 51 rotationally mounted on the housing, the hand-pulling release assembly also includes a pull rod 52 axially movable with respect to the rotating screw 20, the swing link 51 is connected with the pull rod 52. During specific installation, an upper end of the swing link 51 is rotationally connected with the pull rod 52, the swing link 51 is rotationally connected to the upper casing 11, and a lower end of the swing link 51 is connected with a shift block 53, which is relatively fixed with the coupling gear sleeve 31. Specifically, in this embodiment, the shift block 53 is connected with the first bearing 33 on the coupling gear sleeve 31. When the pull rod 52 is pulled, the swing link 51 swings, and the corresponding shift block 53 pushes the coupling gear sleeve 31 to move axially.

When the inner tube 14 in the linear actuator is normally extended, the drive motor 15 drives the rotating screw 20 to rotate forward through the clutch means, and when the inner tube 14 is extended to a predetermined position, the drive motor 15 stops. At this position, when the inner tube 14 has a retract tend, the axial end faces of the first friction sleeve 41 and the second friction sleeve 42 abut against each other. Since the self-locking torsion spring 43 has a clasping resistance effect on the first friction sleeve 41, and the second friction sleeve 42 is also clasped by the release torsion spring 40 in a normal state, when the end faces of the first friction sleeve 41 and the second friction sleeve 42 are abutted against each other, friction resistance is generated therebetween, and the friction resistance generates resistance to the rotating screw 20 to prevent its reversal, so as to achieve the self-locking force.

When the linear actuator needs to retract normally, the drive motor 15 drives the rotating screw 20 to rotate in a reverse direction through the clutch means. At this time, a rotating torque of the rotating screw 20 will overcome the self-locking force provided by the self-locking device, and the rotating screw 20 will continue to reverse, so that the drive nut 21 drives the inner tube 14 to retract.

Figure 2:
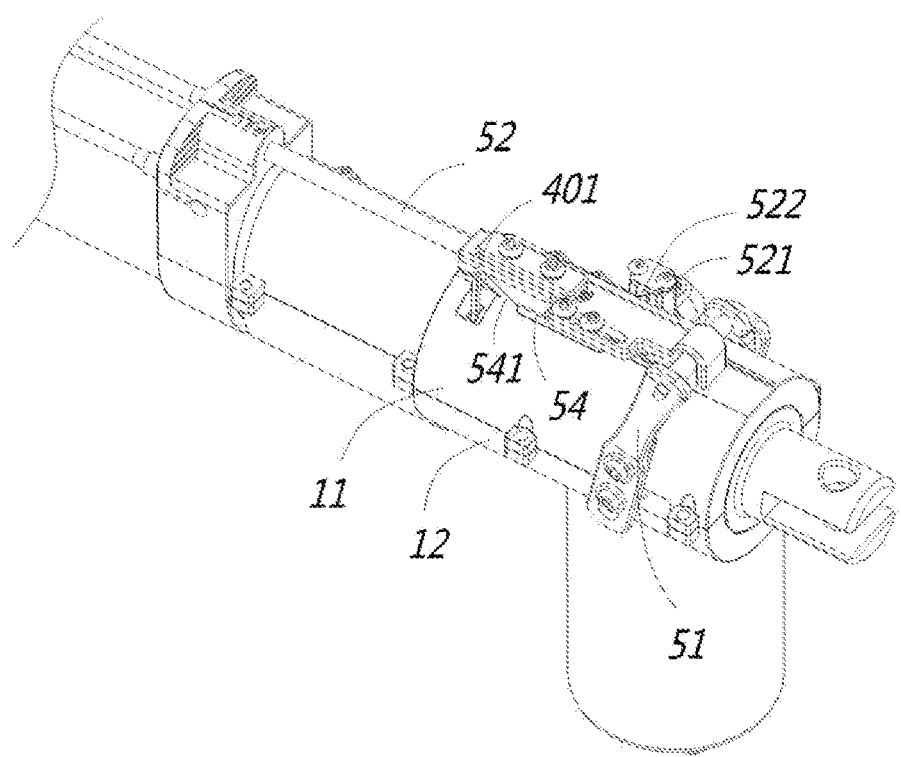
FIG. 2 is an overall schematic diagram II of the linear actuator according to embodiment I of the present invention.
Figure 3:
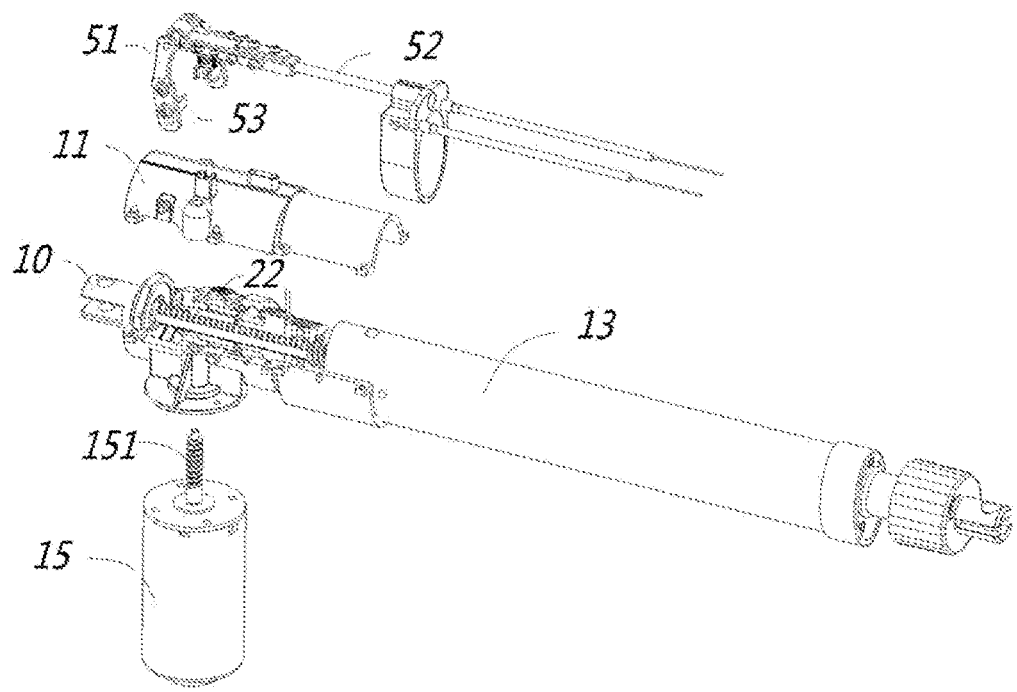
FIG. 3 is an exploded schematic diagram of the linear actuator according to embodiment I of the present invention.

When the linear actuator is extended to a predetermined position, and need to retract quickly, this embodiment can unlock the self-locking device, to achieve the purpose of rapid release, the unlocking in this embodiment is mainly realized by the second driving member, the specific structure is as follows: as shown in FIGS. 2 to 4, the second driving member includes a push block 54, the push block 54 is provided with a guide surface 541, the release torsion spring 40 includes a pin 401 extending radially, the pin 401 in this embodiment extends out of a top of the housing, the guide surface 541 is provided on a side surface of the push block 54, the push block 54 is fixedly connected to a pull rod 52. That is, the self-locking device and the clutch means in this embodiment share the same pull rod 52, as the pull rod 52 is pulled, the guide surface 541 on the push block 54 is in contact with the pin 401, such that the release torsion spring 40 is expanded outwardly, as the release torsion spring 40 is expanded outwardly, the resistance between the release torsion spring 40 and the second friction sleeve 42 is correspondingly reduced. In this state, when the end faces of the first friction sleeve 41 and the second friction sleeve 42 are abutted against each other, the second friction sleeve 42 rotates synchronously with the first friction sleeve 41, therefore, the first friction sleeve 41 does not generate resistance to the rotating screw 20, so that the purpose of no resistance to the rotating screw 20 is achieved. If the clutch means is disconnected and the self-locking device is unlocked at the same time, the rotating screw 20 is basically in a free idling state in this state, the drive nut 21 can be quickly retracted.

In addition, in this embodiment, the guide surface 541 is used to gradually push the release torsion spring 40, with this release method, the self-locking force can be gradually reduced, so that the self-locking force will not disappear immediately, thereby achieving the purpose of stepless adjustment.

In order to better optimize the operation of the clutch means and the self-locking device, in this embodiment, the operation sequence of the clutch means and the self-locking device is optimized. As shown in FIG. 2, the pull rod 52 is provided with an oblong hole for adjustment, the push block 54 is fixed to the oblong hole by a fastening screw, the oblong hole is designed primarily for adjusting the initial position of the push block 54. There are two purposes for setting the initial position, one is to make up for some actual assembly errors, so that the push block 54 can more precisely abut the release torsion spring 40, the second is that, as described herein, the operation sequence between the clutch means and the self-locking device can be adjusted. As shown in FIG. 2, in the initial state, the guide surface 541 of the push block 54 needs to be moved a certain stroke before it comes into contact with the pin 401 of the release torsion spring 40, this stroke can be understood as an idle stroke of the push block 54. During this idle stroke, the clutch means is in normal operation, the purpose of this configuration is that the coupling tooth sleeve 31 will be pivoted first, at the same time, when reset, the self-locking device first self-locks, and then the clutch means carries out power connection. Advantageously, when the self-locking device generates self-locking force, the rotating speed of the rotating screw 20 will be reduced, so that the coupling tooth sleeve 31 and the worm wheel 22 will not be damaged when the coupling tooth sleeve 31 is engaged with the worm wheel 22, and the service life can be greatly prolonged.

In addition, in order to enable users to better perceive the release amplitude, in this embodiment, the pull rod 52 is provided with toothed bars 521, and the housing is provided with movable latches 522, which is connected with a spring. When the pull rod 52 is pulled, the movable latches 522 are clamped into the toothed bars 521 one by one, and the pulling stroke of the pull rod 52 can be sensed by using the movable latches 522 at the position of the toothed bars 521.

It should be noted that the structure of the self-locking device and the clutch means is not limited to the structure shown in this embodiment, in the case of the self-locking device, the self-locking device may include only a single third friction sleeve, the third friction sleeve rotates synchronously with the rotating screw, the release torsion spring is sleeved on the third friction sleeve. In the initial state, the release torsion spring clasps the third friction sleeve to generate resistance to the rotating screw, which is equivalent to the release torsion spring being a self-locking torsion spring. When the release torsion spring is pushed by the push block, the resistance of the release torsion spring to the third friction sleeve disappears. In the case of the clutch means, the clutch means can be implemented by a combination of other spline sleeves and splines. Embodiment II below also shows different embodiments of the self-locking device and the clutch means.

Figure 6:
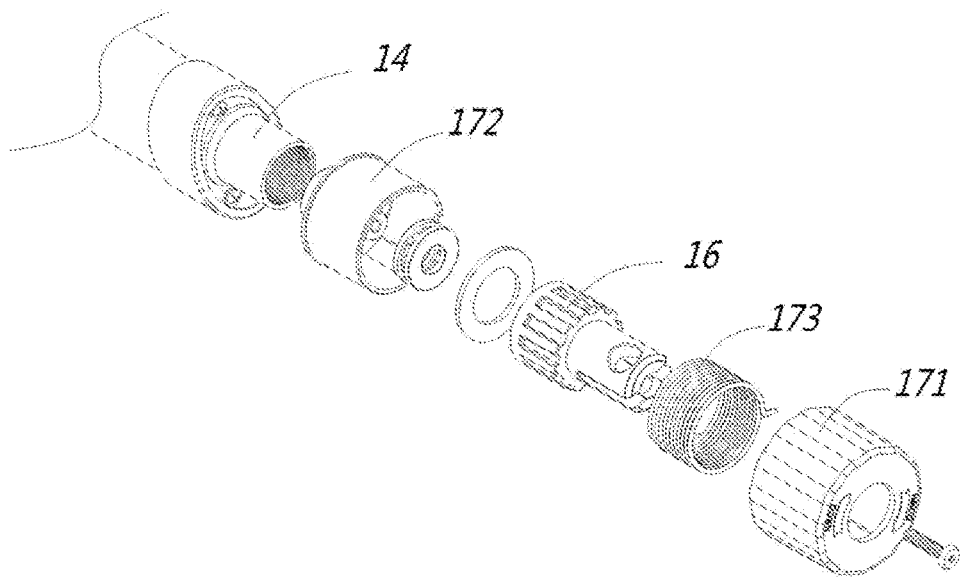
FIG. 6 is an explosion schematic diagram of a hand-rotating release device in the linear actuator according to embodiment I of the present invention.
Figure 7:
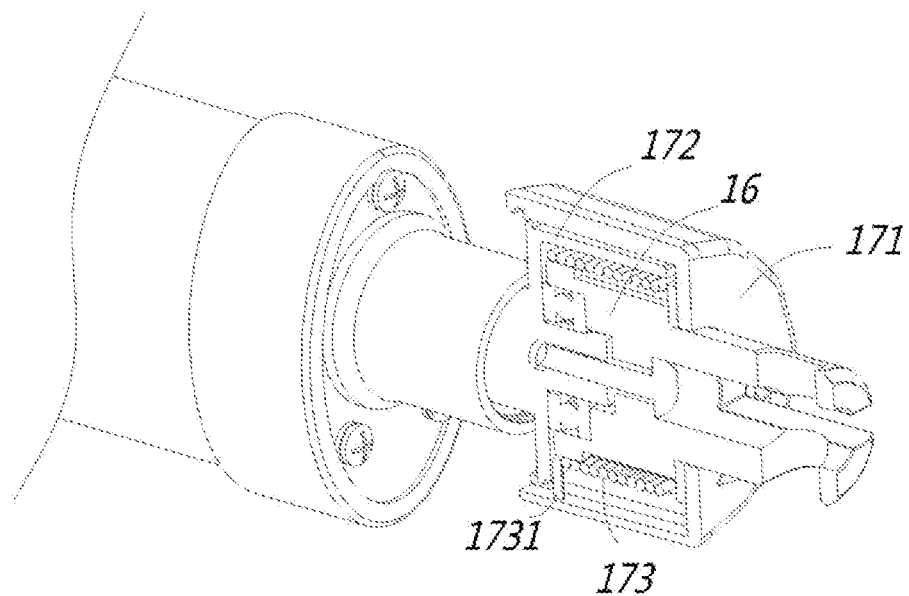
FIG. 7 is a cross-sectional schematic diagram of the hand-rotating release device of the linear actuator according to embodiment I of the present invention.

As shown in FIGS. 6 to 7, in order to further increase the release function of the linear actuator, the linear actuator in the present embodiment has a front puller 16 connected to an end portion of the inner tube 14, and a hand-rotating release device 17 is connected between the front puller 16 and the end portion of the inner tube 14. The power connection between the front puller 16 and the inner tube 14 can be cut off by the hand-rotating release device 17.

Specifically, the hand-rotating release device 17 includes a knob sleeve 171, a connecting sleeve seat 172 and a hand-rotating release torsion spring 173, the connecting sleeve seat 172 is fixedly connected with the inner pipe 14, the front puller 16 is fitted with the connecting sleeve seat 172, and the hand-rotating release torsion spring 173 is provided between the connecting sleeve seat 172 and the front puller 16. Specifically, the hand-rotating release torsion spring 173 is sleeved outside the front puller 16, and the hand-rotating release torsion spring 173 also has a corresponding pin 1731, the pin 401 penetrates through a gap in the connecting sleeve seat 172 and abuts against the knob sleeve 171, and the knob sleeve 171 is used to pivot the hand-rotating release torsion spring 173 to contract radially or expand radially when rotated, thereby controlling the frictional resistance of the hand-rotating release torsion spring 173 to the front puller 16.

Embodiment II

As shown in FIG. 8 to FIG. 11, the operation principle of this embodiment is similar to that of the embodiment I, mainly in that the specific structures of the self-locking device, the clutch means, the first driving member and the second driving member are different.

Regarding the self-locking device of the embodiment, in the embodiment I, the first friction sleeve 41 and the second friction sleeve 42 are axially arranged side by side, outer end faces of the first friction sleeve 41 and the second friction sleeve 42 are abutted against each other. In this embodiment, the second friction sleeve 42 is sleeved outside the first friction sleeve 41, the outer end face of the first friction sleeve 41 abuts against the inner end face of the second friction sleeve 42. For the installation between the first friction sleeve 41 and the rotating screw 20 as in embodiment I, the first friction sleeve 41 rotates synchronously with the rotating screw 20, and the self-locking torsion spring 43 is also sleeved outside of the first friction sleeve 41, while the release torsion spring 40 is sleeved outside of the second friction sleeve 42. The working principle is similar to that of embodiment I, that is, the self-locking force of the self-locking torsion spring 43 mainly comes from the end friction force of the first friction sleeve 41 and the second friction sleeve 42.

The first friction sleeve 41 in this embodiment is similar in structure in embodiment I and also includes a front shaft sleeve 411 and a rear shaft sleeve 412, a thrust bearing is arranged between the front shaft sleeve 411 and the rear shaft sleeve 412, the self-locking torsion spring 43 is sleeved outside the front shaft sleeve 411 and the rear shaft sleeve 412 at the same time, and the rear shaft sleeve 412 abuts against an inner end face of the second friction sleeve 42.

The advantage of this self-locking device is that the installation space is smaller, mainly the axial space is smaller, which is beneficial to reduce the volume of the whole linear actuator.

Regarding the clutch means of this embodiment, the clutch means in the embodiment also includes a spline sleeve 34, the spline sleeve 34 is positioned between the rotating screw 20 and the coupling gear sleeve 31, the spline sleeve 34 rotates synchronously with the rotating screw 20, and torque transmission is mainly implemented by the flat position between the spline sleeve 34 and the rotating screw 20, while the coupling gear sleeve 31 and the worm wheel 22 always keep synchronous rotation, and the first driving member mainly drives the clutch between the coupling gear sleeve 31 and the spline sleeve 34.

The first driving member in this embodiment is slightly different from the embodiment I in that a shift block 55 is used, and the shift block 55 is rotationally connected with the pull rod 52. When the pull rod 52 is pulled, the shift block 55 pivots the axial movement of the coupling gear sleeve 31.

Figure 8:
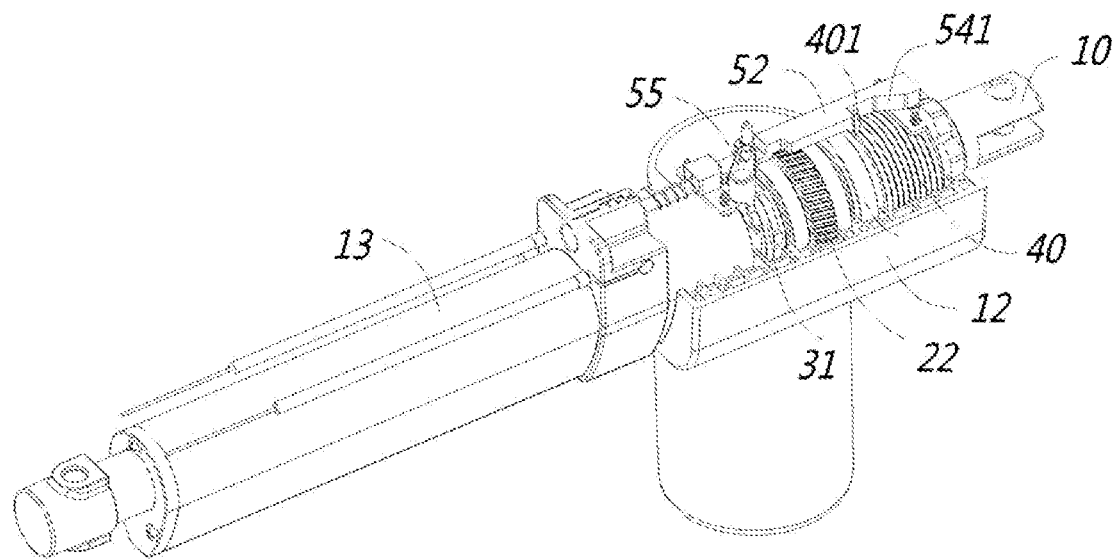
FIG. 8 is a schematic structural diagram of a linear actuator according to embodiment II of the present invention.
Figure 9:
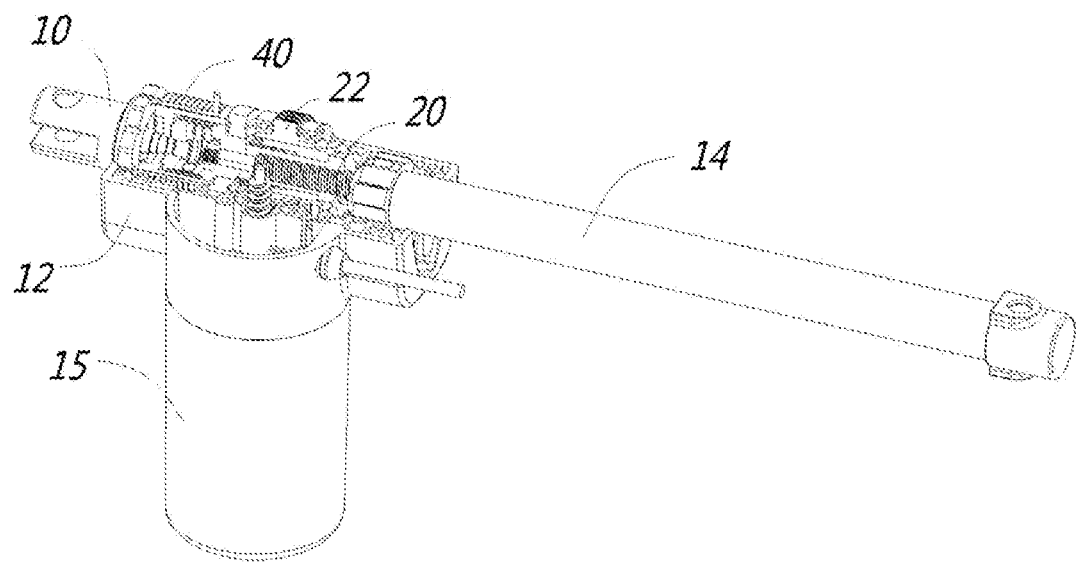
FIG. 9 is a partially cut-away schematic diagram of the linear actuator according to embodiment II of the present invention.
Figure 10:
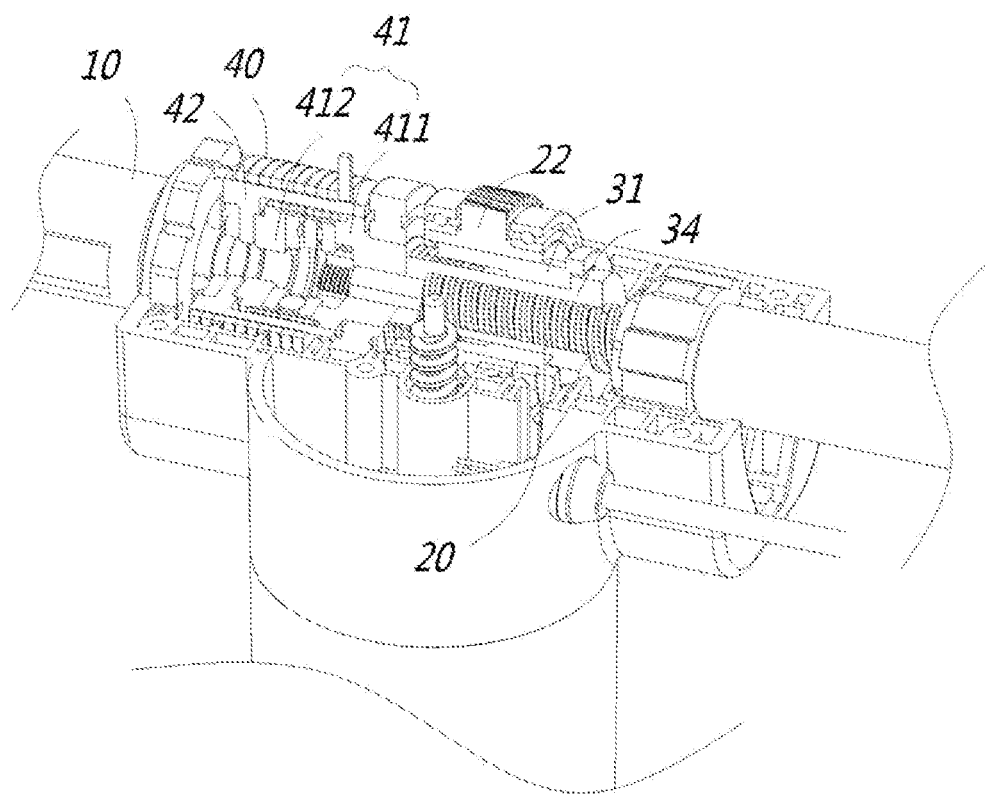
FIG. 10 is an enlarged schematic diagram of the partial cut-away linear actuator according to embodiment II of the present invention.
Figure 11:
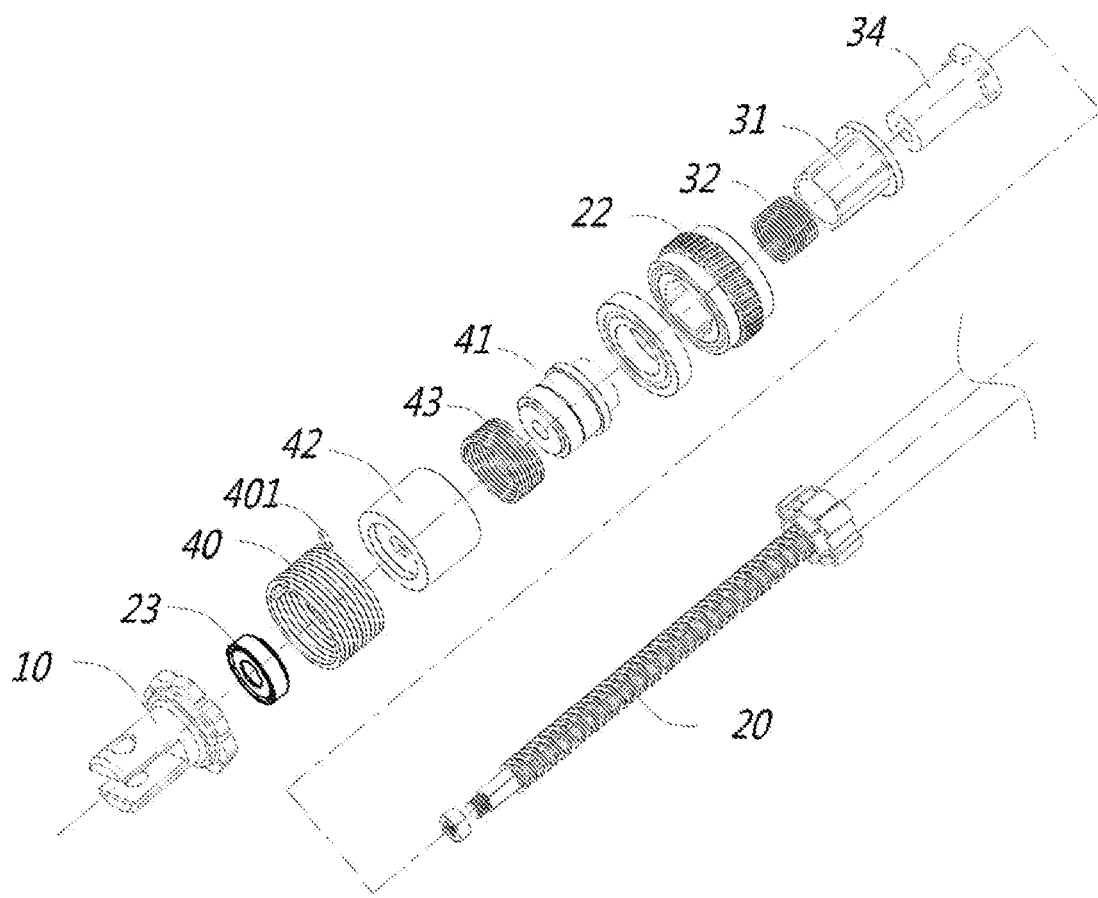
FIG. 11 is an explosion schematic diagram of internal parts in the linear actuator according to embodiment II of the present invention.

The second driving member in this embodiment is directly integrated with the pull rod 52 as shown in FIG. 8. The pull rod 52 is provided with a guide surface 541.

In addition, compared with the embodiment I, the hand-rotating release device 17 is eliminated in this embodiment.

The clutch means in this embodiment is the same as that in the embodiment I, the coupling gear sleeve itself is not subjected to the axial force from the rotating screw 20, and the axial force in this embodiment is transmitted as follows:

when the inner tube 14 of the linear actuator extends to a predetermined position and has a tendency to retract, the rotating screw 20 is subjected to axial force, the spline sleeve 34 abuts against the shoulder position of the rotating screw 20, therefore, the axial force of rotating screw 20 is transmitted to the spline sleeve 34 at the first time, an end face of the spline sleeve 34 abuts against the end face of the first friction sleeve 41. That is, the spline sleeve 34 and the first friction sleeve 41 are axially limited, therefore, the axial force is transmitted to the first friction sleeve 41, and a tail end face of the first friction sleeve 41 abuts against the inner end face of the second friction sleeve 42, so the axial force is transmitted to the second friction sleeve 42, and a tapered roller bearing 23 is arranged between the tail end face of the second friction sleeve 42 and the tail puller 10, so the axial force is finally transmitted to the tail puller 10 through the tapered roller bearing 23.

In this embodiment, the spline sleeve 34, the first friction sleeve 41 and the second friction sleeve 42 together constitute an axial limiting sleeve, the rotating screw 20 transmits the axial force to the tail puller 10 through the axial limiting sleeve. From the whole axial force transmission process, the coupling gear sleeve in this embodiment will not be acted by the axial force all the time, so the first driving member is also very labor-saving when pivoting the coupling gear sleeve.

The foregoing is only a specific embodiment of the present invention, but the scope of protection of the present invention is not limited thereto, and those skilled in the art will appreciate that the present invention includes, but is not limited to, the contents described in the drawings and the above specific embodiments. Any modifications that do not depart from the functional and structural principles of the present invention will be included within the scope of the claims.

What is claimed is:

1. A linear actuator comprising a housing, a worm wheel, a rotating screw, a drive nut, a first friction sleeve and a self-locking torsion spring, the worm wheel driving the rotating screw to rotate, the rotating screw rotating to drive the drive nut to move axially along the rotating screw, a clutch means being arranged between the worm wheel and the rotating screw, wherein the clutch means comprises a coupling gear sleeve axially movable relative to the rotating screw, the rotating screw is sleeved with an axial limiting sleeve, the axial limiting sleeve and the housing are abutted axially, and the axial limiting sleeve and the rotating screw maintain alignment in an axial direction, when the rotating screw is subjected to an axial load, the rotating screw transmits an axial force to the housing through the axial limiting sleeve, the axial force is not transmitted between the coupling gear sleeve and the axial limiting sleeve in the axial direction, the self-locking torsion spring is sleeved on the first friction sleeve, and the axial limiting sleeve comprises the first friction sleeve.

2. The linear actuator according to claim 1, wherein the linear actuator further comprises a second friction sleeve, the first friction sleeve and the second friction sleeve are abutted axially, the second friction sleeve is sleeved with a release torsion spring, and the axial limiting sleeve comprises the first friction sleeve and the second friction sleeve.

3. The linear actuator according to claim 2, wherein the first friction sleeve and the second friction sleeve are axially arranged side by side, and outer end faces of the first friction sleeve and the second friction sleeve abut against each other.

4. The linear actuator according to claim 3, wherein the second friction sleeve is provided with a bearing, the housing is provided with a bearing groove for mounting the bearing, and the bearing is axially limited with the housing.

5. The linear actuator according to claim 2, wherein the second friction sleeve is sleeved outside the first friction sleeve, and an outer end face of the first friction sleeve abuts against an inner end face of the second friction sleeve.

6. The linear actuator according to claim 2, wherein the first friction sleeve is sleeved at an end portion of the rotating screw, and the housing comprises a tail puller at the end portion, and the tail puller being axially limited with the second friction sleeve.

7. The linear actuator according to claim 6, wherein a spline sleeve is arranged between the rotating screw and the coupling gear sleeve, and the spline sleeve is axially limited with the first friction sleeve, and the axial limiting sleeve comprises the spline sleeve, the first friction sleeve and the second friction sleeve.

8. The linear actuator according to claim 6, wherein a tapered roller bearing is arranged between the second friction sleeve and the tail puller.

9. The linear actuator according to claim 1, wherein the linear actuator further comprises a hand-pulling release assembly, the hand-pulling release assembly further comprising, a pull rod being axially movable relative to the rotating screw and a swing link being rotationally connected with the pull rod, and when the pull rod is pulled, the swing link swings to axially push the coupling gear sleeve.

* * * * *